United States Patent [19]

Appel et al.

[11] Patent Number: 5,341,158
[45] Date of Patent: Aug. 23, 1994

[54] RASTER OUTPUT SCANNER FOR A XEROGRAPHIC PRINTING SYSTEM HAVING LASER DIODES ARRANGED IN A LINE PARALLEL TO THE FAST SCAN DIRECTION

[75] Inventors: James J. Appel, Brighton, N.Y.; Thomas L. Paoli; Tibor Fisli, both of Los Altos, Calif.

[73] Assignee: Xerox Corporation, Stamford, Conn.

[21] Appl. No.: 948,512

[22] Filed: Sep. 22, 1992

[51] Int. Cl.⁵ .................................................. G01D 9/42
[52] U.S. Cl. ........................................ 346/108; 346/160
[58] Field of Search ............... 346/108, 160; 359/204, 359/206, 207, 217

[56] References Cited

U.S. PATENT DOCUMENTS

| | | | |
|---|---|---|---|
| 4,393,387 | 7/1983 | Kitamura | 346/108 |
| 4,404,571 | 9/1983 | Kitamura | 346/108 |
| 4,423,426 | 12/1983 | Kitamura | 346/108 |
| 4,445,126 | 4/1984 | Tsukada | 346/108 |
| 4,474,422 | 10/1984 | Kitamura | 346/108 |
| 4,591,903 | 5/1986 | Kawamura et al. | 346/108 |
| 4,716,568 | 12/1987 | Scifres et al. | 346/108 |
| 4,786,918 | 11/1988 | Thornton et al. | 346/108 |
| 4,847,642 | 7/1989 | Murayama et al. | 346/108 |
| 4,903,067 | 2/1990 | Murayama et al. | 346/108 |
| 4,962,312 | 10/1990 | Matuura et al. | 346/108 |
| 4,978,976 | 12/1990 | Okino | 346/108 |
| 5,014,075 | 5/1991 | Okino | 346/108 |
| 5,089,908 | 2/1992 | Jodoin et al. | 346/108 |
| 5,179,462 | 1/1993 | Kageyama et al. | 346/108 |
| 5,181,137 | 1/1993 | Koide | 359/217 |
| 5,243,359 | 9/1993 | Fisli | 346/108 X |
| 5,291,223 | 3/1994 | Ogane et al. | 346/108 |

*Primary Examiner*—Benjamin R. Fuller
*Assistant Examiner*—Randy W. Gibson
*Attorney, Agent, or Firm*—Oliff & Berridge

[57] ABSTRACT

A raster output scanner (ROS) laser diode architecture enables a plurality of laser diodes, which produce light beams at separated wavelengths, to be spaced a convenient distance apart for a multistation printer, by arranging the diodes in a line that is parallel to the fast scan direction of the ROS. Wavelength discriminating optics are used to alternately separate and reflect the light beams reflected from a single ROS polygon mirror. These separated and reflected beams then expose their associated photoreceptors with a rasterized image that is subsequently transferred to a support medium such as plain paper and developed into an image.

22 Claims, 5 Drawing Sheets

RASTER OUTPUT SCANNER FOR A XEROGRAPHIC PRINTING SYSTEM HAVING LASER DIODES ARRANGED IN A LINE PARALLEL TO THE FAST SCAN DIRECTION

FIELD OF THE INVENTION

The present invention relates to multistation xerographic printers utilizing a shared raster output scanner and, in particular, to architectures of a laser diode array used in such shared raster output scanners.

BACKGROUND OF THE INVENTION

Flying spot scanners (often referred to as raster output scanners (ROS)) conventionally have a reflective multifaceted polygon mirror that is rotated about its central axis to repeatedly sweep one or more intensity modulated beams of light across a photosensitive recording medium in a line scanning direction (also known as the fast-scan direction) while the recording medium is being advanced in an orthogonal, or "process", direction (also known as the slow scan direction) such that the beams scan the recording medium in accordance with a raster scanning pattern. Digital printing is performed by serially intensity modulating each of the beams in accordance with a binary sample stream, whereby the recording medium is exposed to the image represented by the samples as it is being scanned. Printers that sweep several beams simultaneously are referred to as multibeam printers. Both ROS and multibeam printer techniques are illustrated in U.S. Pat. No. 4,474,422 to Kitamura.

In the Kitamura patent, multiple lasers are arranged diagonally (see FIG. 10B of the Kitamura patent) to sweep multiple lines across a single photoreceptor. The beams are displaced from each other in the cross-scan direction so that multiple lines can be scanned simultaneously across the photoreceptor. In addition, an object of the Kitamura patent is to reduce variations in pitch by spacing individual lasers within the laser array closely in a compact structure.

High speed process color or multi-highlight color xerographic image output terminals require multiple independently addressable raster lines to be printed simultaneously at separate exposure stations. This is called multistation printing. Conventional architectures for multistation process color printers use a plurality of separate ROSs, usually four independent ROSs, one for each system color for example, as illustrated in U.S. Pat. Nos. 4,847,642 and 4,903,067 to Murayama et al. the disclosures of which are herein incorporated by reference.

Problems with these systems include the high cost related to the cost of multiple ROSs, the high cost of producing nearly identical multiple ROSs and associated optics, and the difficulty of registering the system colors.

A partial solution to the problems of multistation xerographic systems with individual ROSs is disclosed in U.S. Pat. No. 4,591,903 to Kawamura et al. U.S. Pat. No. 4,591,903, particularly with regard to FIG. 6 discloses a recording apparatus (printer) having multiple recording stations and multiple lens systems, but only two polygon mirrors. With two polygon mirrors and only one associated drive motor, the cost of the system is reduced. However, differences in the lenses, the polygon and mirror surfaces could still cause problems with color registration.

Another approach to overcoming the problems of multistation printers having individual ROSs is disclosed in U.S. Pat. No. 4,962,312 to Matuura. U.S. Pat. No. 4,962,312 discloses overlapping a plurality of beams using an optical beam combiner, deflecting the overlapped beams using a single polygon mirror, separating the deflected beams using an optical filter (and polarizers if more than two beams are used), and directing the separated beams onto associated photoreceptors. The advantage of overlapping the laser beams is a significant cost reduction since the ROS (i.e., the polygon mirror and all optics) is shared by all the stations.

However, an actual embodiment of the apparatus described in U.S. Pat. No. 4,962,312 would be rather complicated and expensive, especially if four system colors are to be printed. The use of optical beam combiners to overlap beams so that they have similar optical axes would be difficult, expensive and time consuming. Obtaining similar size spots on each photoreceptor would also be difficult because it would be difficult to establish the same optical path lengths for each beam. It would also be difficult to ensure that the latent images on the photoreceptors are registered. Each of these problems is at least partially related to the relative positions of the laser sources.

U.S. Pat. No. 5,243,359 to Tibor Fisli, the disclosure of which is incorporated herein by reference in its entirety, discloses a ROS system suitable for deflecting multiple laser beams in a multistation printer. A rotating polygon mirror simultaneously deflects a plurality of clustered, dissimilar wavelength laser beams, having, their largest divergence angles parallel to one another that are subsequently separated by a plurality of optical filters and directed onto their associated photoreceptors. Similarly dimensioned spots are obtained on each photoreceptor by establishing similar optical path lengths for each beam. This is facilitated by locating all lasers in an integral unit. However, laser diodes illustrated in U.S. Pat. No. 5,243,359 are arranged in a line in the cross scan direction, i.e., parallel to the axis of rotation of the polygon mirror (see FIG. 2 of U.S. Pat. No. 5,243,359. Diodes oriented in the cross-section direction must be arranged such that they are packed closely in a direction parallel to the polygon mirror rotation axis to minimize beam characteristic deviations such as spot size, energy uniformity, bow and linearity. That is, the laser diodes are kept as close together as possible in the direction parallel to the polygon mirror rotation axis (i.e., the height direction of the polygon mirror) so that the light beams strike as nearly the same portion of the polygon mirror as is possible. However, since the light beams are spaced from each other in the height direction of the polygon mirror, the beams do not all strike the same portions of each facet of the polygon mirror, and therefore, are not uniformly reflected. Additionally, locating the laser diodes close to each other introduces cross-talk.

SUMMARY OF THE INVENTION

It is therefore an object of this invention to provide a multiple laser ROS system in which laser diode spacing constraints can be relaxed, thereby easing fabrication and reducing cost.

In order to realize this and other objects, and to overcome the shortcomings set forth above, a scanning optical system for scanning photoreceptors with a plurality of light beams comprises a beam generating means for generating a plurality of light beams having different wavelengths arranged in a line parallel to the fast scan direction, an optical means for simultaneously reflecting the dissimilar wavelength beams and an optical filtering means for differentially passing or reflecting the beams. The beams then scan a plurality of photoreceptors which are used to create an image on a suitable support member such as, for example, plain paper.

BRIEF DESCRIPTION OF THE DRAWINGS

The invention will be described in detail with reference to the following drawings in which like reference numerals refer to like elements and wherein.

DETAILED DESCRIPTION OF PREFERRED EMBODIMENTS

While this invention is described in some detail herein, with specific reference to certain illustrated embodiments, it is to be understood that there is no intent to be limited to those embodiments. On the contrary, the aim is to cover all modifications, alternatives and equivalents falling within the spirit and scope of the invention as defined by the claims. For example, the present invention is applicable to a two station configuration for single highlight color, and to a three station configuration for multiple highlight color, as well as to the preferred embodiment described below for full-color applications using four stations.

Applying the concept of wavelength separation of the light beams, the laser diode orientation requirement of multistation xerography, is fundamentally changed from the requirement of single station xerography. When laser diodes are used in a single beam ROS to write multiple lines simultaneously onto the same exposure station, they must be spaced from each other in the cross-scan direction so that they simultaneously scan different lines on the photoreceptor. When the multiple diodes are arranged in this way, they must be positioned as close to each other as possible to minimize differential bow, and the number of lines of interlace. This constraint makes fabrication of the diodes without crosstalk difficult. In multiple diode arrays defined for single station xerography, the diodes are typically spaced 10 $\mu$m apart.

In multi-station xerography, however, where the beams are directed to different photoreceptors or different image positions of a single photoreceptor, the diodes can be oriented coincident in the cross scan direction or in the fast scan direction (i.e., perpendicular to the axis of rotation of the polygon mirror). It remains important, when diodes are arranged in a line in the fast scan direction, that the offset between the diodes in the cross scan direction is minimized (i.e., within 2 $\mu$m of each other in the cross scan direction). In a ROS architecture in which the laser diodes are positioned along a line that is parallel to the fast scan direction of the ROS, the requirement to have the laser diodes closely packed (typically 10 $\mu$m) can be relaxed. In typical ROS designs, relatively large spacings (>200 $\mu$m) between the diodes, in the fast scan direction, are feasible. The fast scan spacing of the diodes causes the beam from each diode to be incident on the polygon at a slightly different feed angle. Feed angle is defined as the angle between the pre-polygon beam and post polygon beam at center of scan. Typical ROS designs are very insensitive to changes in feed angle. The effect on scan linearity, of relatively large changes in feed angle is very small because the beam from each diode travels through the same portion of the scan lens to arrive at any given point along the scan line, independent of the feed angle. The effect of changes in feed angle on spot intensity, and fast scan spot width is also very small because these parameters are very slowly varying functions of the beam geometry. This enables multiple laser diodes, at widely separated wavelengths, to be spaced a convenient distance apart thus simplifying their fabrication.

It, therefore, will be understood that the spacing constraints of multiple diode arrays for multi-station printers can be relaxed by providing an architecture in which the diodes are positioned along a line that is parallel to the fast scan direction, and wherein the diodes are not spaced from each other in the cross-scan direction.

To implement the present invention, the ROS optics is designed to overscan in the fast scan direction so that the scan line length over which all the beams overlap is the desired scan line length. That is, the ROS optics is designed to cover a larger scan line length than would be needed if the diodes were arranged in a line in the cross scan direction. This overscan is necessary since each of the laser diodes emits a beam that would be incident on the polygon at a slightly different angle of incidence, thus causing the scan lines from different diodes to be offset from each other in the fast scan direction. It is understood that the timing data sent to the separate beams would be adjusted electronically to account for the differing feed angles of the different beams. Any number of conventional provisions can be made to provide for overscan. The beams are then reflected off the polygon, and pass through the scan lens. The beams are then separated by filters which differentially pass or reflect the light beams based on their different wavelengths.

Figure 1:
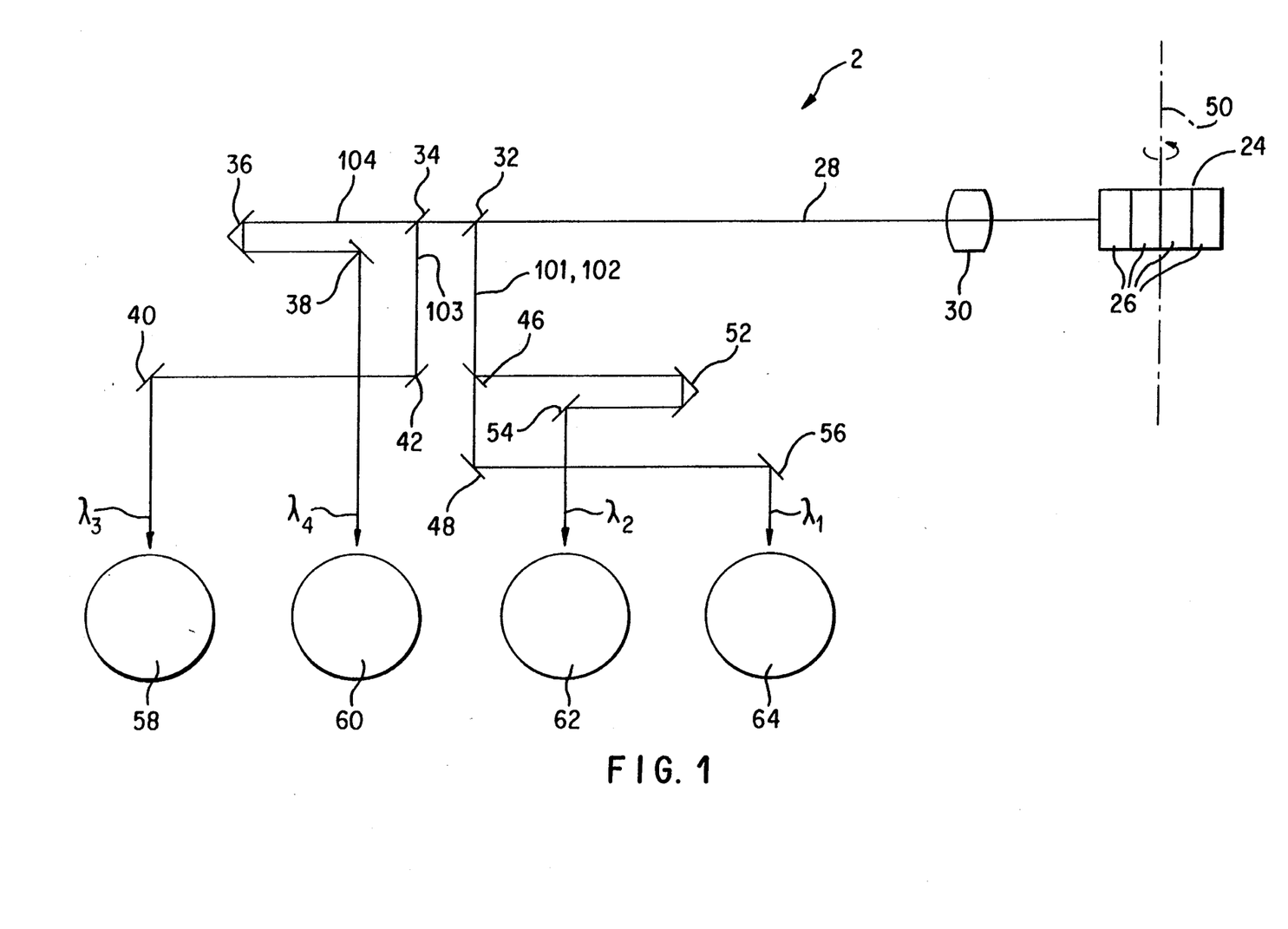
FIG. 1 is a simplified schematic view of a ROS system according to an embodiment of the present invention.
Figure 2:
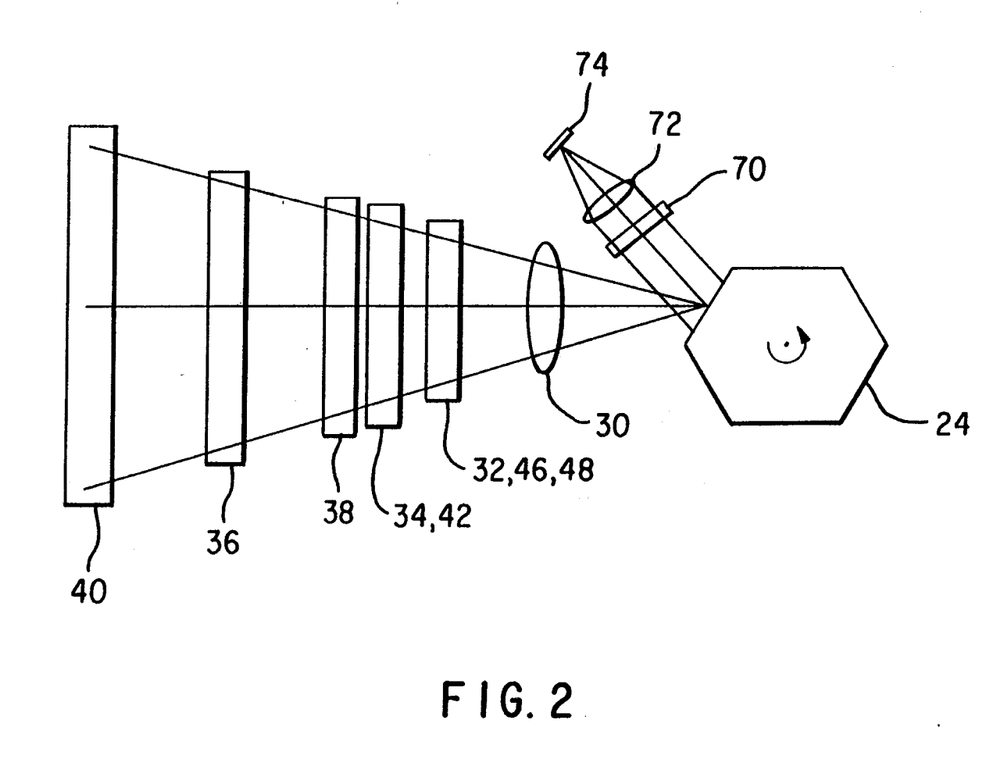
FIG. 2 is a top view illustrating the laser sources, beam forming optics, rotating polygon mirror and an optical filtering means.

As shown in FIGS. 1 and 2, the ROS optics comprise a collimator 72, a cylinder lens 70, polygon mirror 24, beam splitting mirrors 32, 34, 46 and reflective mirrors 36, 38, 40, 42, 48, 52, 54, 56. The laser beams 101, 102, 103 and 104, having wavelengths $\lambda_1$, $\lambda_2$, $\lambda_3$ and $\lambda_4$, respectively, produced by beam generating means 74 pass through the collimator 72 and the cylinder lens 70 which direct the beams onto an optical path such that they illuminate a rotating polygon mirror 24 having multiple facets 26. As the polygon mirror rotates about axis 50, it deflects the beams simultaneously to a scan lens 30 which focuses the beams and corrects for errors such as polygon angle error and wobble. For purposes of illustration, it is assumed that the ROS scan lens contains a toroidal element to provide wobble correction. The present invention can also be used in a system that uses alternative wobble correction means such as, for example, a cylinder mirror following a spherical scan lens, a cylinder mirror following a cylindrical scan lens, or a cylinder mirror following a spherical/cylindrical scan lines, or a cylinder lens very near the photoreceptor.

In FIG. 1, the beams from the corrective scan lens 30 are directed along a first optical path 28 to a first optical filter 32. The first optical filter is, for example, a wavelength selective beam separator comprised of a wavelength selective, multi-layer film for example. Such separators are well known and are discussed and described in Volume 1 of "Applied Optics and Optical Engineering," (1965) edited by R. Kingslake. In the illustrative embodiment, wherein four beams are produced by source 74, the characteristics of the first optical filter 32 should be chosen such that two beams 103, 104 are passed while the remaining two beams 101, 102 are reflected.

The passed beams 103, 104 are then separated by another filter 34 of the type described above that reflects one of the beams 103 and passes the other beam 104. The reflected beams 101, 102 are similarly separated and reflected based on their wavelengths by the filter 46. The filters are selected such that they have an appropriate wavelength sensitive multi-layer film for implementing the invention. See, for example, the above-incorporated U.S. Pat. No. 5,243,359.

As the multiple station printer 2 is for full-color reproduction, each laser beam produces a latent image on its associated photoreceptor 58, 60, 62, 64 that corresponds to a system color that will be transferred onto a recording medium (not shown) such as, for example, plain paper. Photoreceptors 58, 60, 62, 64 can be, for example, belts or drums.

Since the system illustrated in FIG. 1 simultaneously forms, sweeps and deflects each light beam, and since each beam is from substantially from the same spatial location and all beams have parallel optical axes, similarly dimensional beams are input to the wavelength selective optical filters 32, 34. Thus the problem of maintaining equal optical path lengths for each of the beams reduces to the much simpler problem of maintaining substantially equal optical path lengths from the optical filters 32, 34 to the photoreceptors 58, 60, 62, 64. Substantially equal path lengths are set by properly adjusting the optical path lengths after the optical filters 32, 34 by properly positioning mirrors 36, 38, 40, 42, 46, 48, 52, 54, 56. Equalization of optical path lengths results in similarly dimensioned spots at each photoreceptor 58, 60, 62, 64. Equalization of the optical path lengths as disclosed in the present invention is significantly easier than adjusting the positions of spatially separated lasers at the input to the collection optics as disclosed in previously described U.S. Pat. No. 4,962,312 to Matuura.

Figure 3:
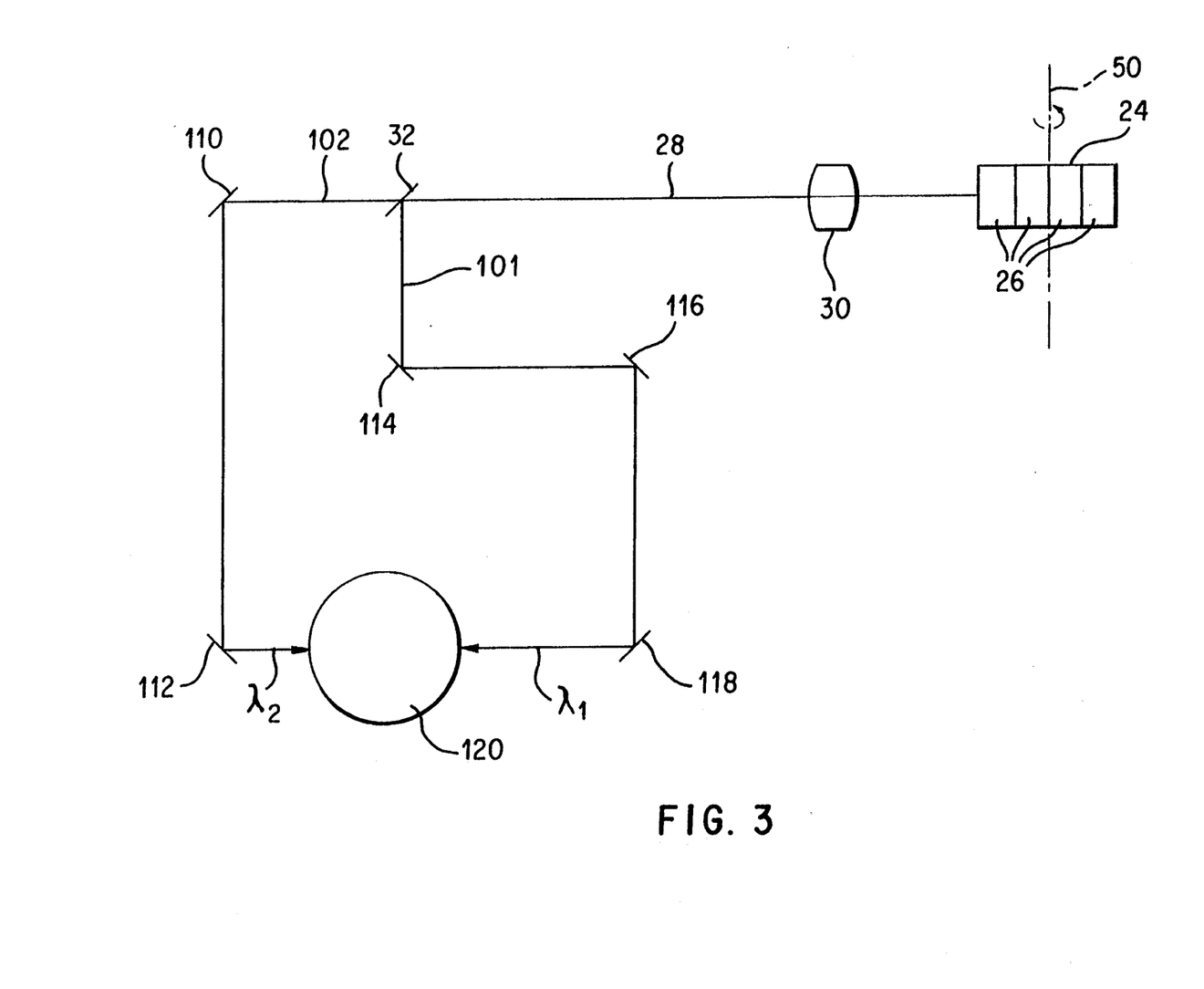
FIG. 3 is a simplified schematic view of a single photoreceptor ROS system according to an embodiment of the present invention.

In another embodiment, shown in FIG. 3, multiple beams 28 can be used to expose different portions of a single photoreceptor 120, such as, for example, a photosensitive belt or drum. In a single photoreceptor embodiment using, for example, two light beams 101, 102 the different wavelength $\lambda_1$, $\lambda_2$ beams 101, 102 are deflected off of a facet 26 of the polygon 24, which is rotating about its central axis 50. The beams 101, 102 then pass through a corrective scan optics system 30. The beams 101, 102 are separated by a wavelength selective filter 32 of the type described above that reflects one of the beams 101 and passes the other beam 102. The beams 101, 102 are then directed to appropriate portions, or image planes, of the photoreceptor 120 by mirrors 110, 112, 114, 116, 118. The latent images on the photoreceptor 120 are then transferred to a recording medium, such as, for example plain paper (not shown).

The architectures shown in FIGS. 1 and 3 are known as single pass, multicolor printers because a sheet needs to pass by the multiple photoreceptors of FIG. 1, or by the single photoreceptor of FIG. 3 a single time in order to have multiple toner patterns (usually having different colors) deposited thereon.

In accordance with the present invention, since the beams are arranged in a line parallel to the fast scan direction (i.e., the direction in which the polygon 24 rotates), the diode spacing is not subject to the extreme design constraints associated with laser diodes that are oriented in a cross scan direction. Since the line of beams produced by the laser diodes is parallel to the fast scan direction, the diode characteristic variations present in devices having a line of diodes arranged in the cross-scan direction, such as, for example, differential bow, and diode crosstalk, are eliminated. Thus, all the advantages associated with multi-layer single optics printing systems are realized, while the need to make closely packed laser diode arrays is avoided.

In laser diode arrays designed for single station xerography (i.e., the line of diodes is arranged in the cross-scan direction), the diodes are typically 10 $\mu$m apart. Likewise, in a multi-layer xerographic printing system wherein the laser diodes are arranged in a line in the cross-scan direction, the diodes are packed closely together to reduce diode characteristic variations. The present invention allows the diode spacing constraint to be relaxed. The diode spacing can be relaxed, for example, to 333 $\mu$m, or 0.33 mm. The distance between the first and last diodes in a four laser array (typical for color printing applications), would be 1 mm for a 0.33 mm inter-diode spacing. With this spacing, a typical overfilled collimator focal length of 50 mm would have to cover a field of only 0.57 degrees. A collimator can easily be corrected for this small field angle. The angle of incidence, in this example, of the beam on the polygon would differ from the first diode to the last diode by 2.28 degrees (4 × 0.57 degrees). Since the angle doubles on reflection off the polygon, the system would have to be designed to cover a scan angle of 4.56 degrees larger than the scan angle that would be required for a single laser diode system. This can easily be done in the design of the optics since 4.56 degrees is typically a small fraction of the total scan angle. For example, typical scan angles are 24 degrees for a 15 facet polygon.

Figure 4:
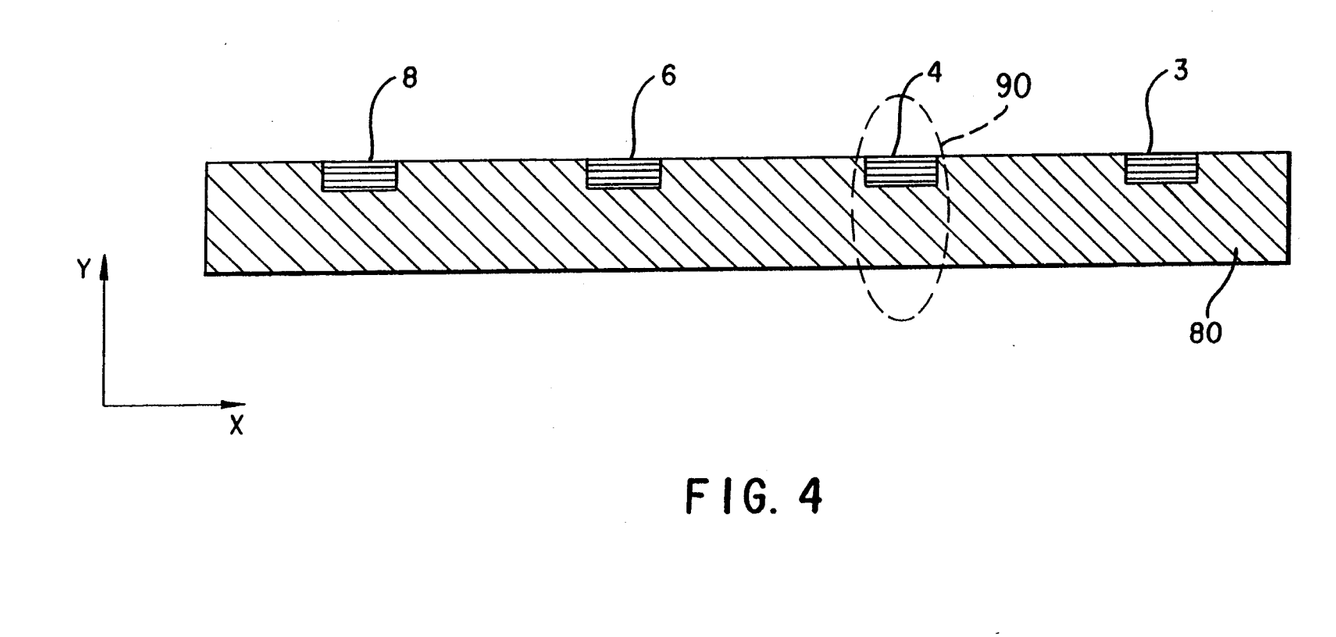
FIG. 4 is a front view of multiple diodes for emitting light beams of different wavelengths formed on a single chip.
Figure 5:
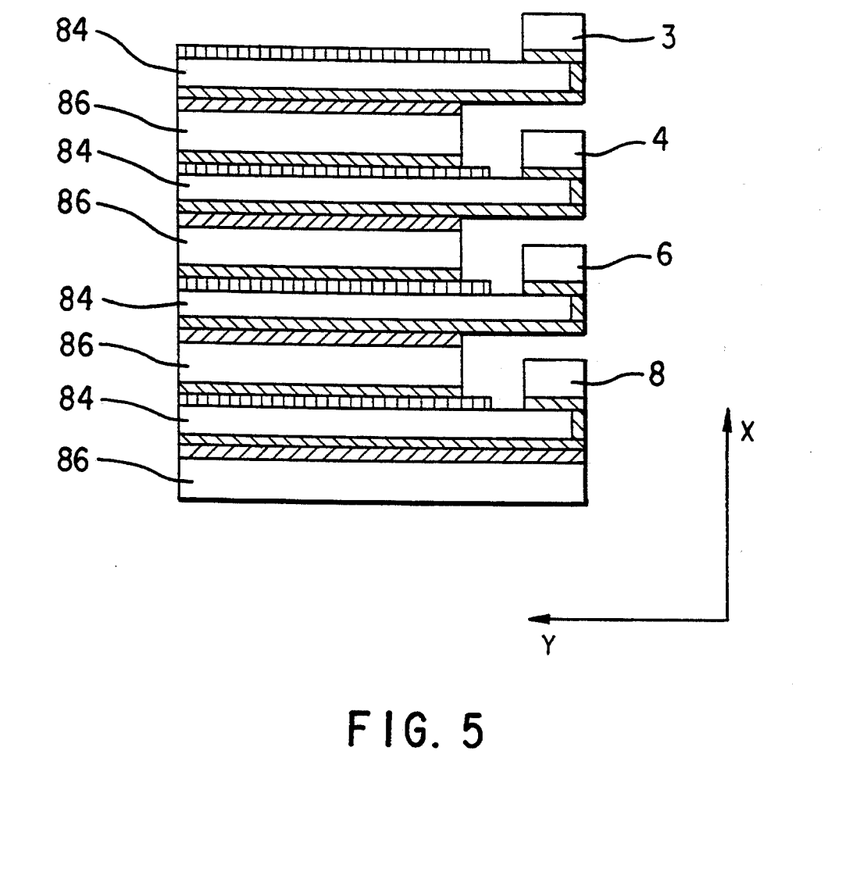
FIG. 5 is a side view of another mechanical support structure for an array of diodes capable of emitting light beams of dissimilar wavelength.

The laser diodes 3, 4, 6 and 8 could all be fabricated on a single chip 80, as shown in FIG. 4, or they can be fabricated on separate chips, as shown in FIG. 5, which are then bonded together. Multiple wavelength monolithic arrays of diode lasers of the type shown in FIG. 4 can be constructed as disclosed in U.S. Pat. application No. 07/579,218 entitled "Semiconductor Structures Fabricated Via Photo Induced Evaporation Enhancement During In Situ Epitaxial Growth', the disclosure of which is incorporated herein by reference. From an optical design perspective, the large divergence angle of the diodes should be in the fast scan direction (denoted by the arrow X in the Figures). This can best be achieved with separate chips as shown in FIG. 5.

Lasers can be assembled as shown in FIG. 5 using the techniques described in U.S. Pat. No. 4,716,568 the disclosure of which is incorporated herein by reference.

In the embodiment shown in FIG. 5, an insulating material such as, for example, BeO, is used for spacers 86 and mounting plates 84. The spacers can be, for example, 150 μm thick while the mounting plates can be, for example, 100 μm thick. Thus, four lasers 3, 4, 6, 8 can be easily assembled within 1 mm in the fast can direction. Using alignment marks and micropositioning in the assembly process, it should be possible to place the chips within 2 μm of a line in the fast scan direction, shown by the arrow X. On the other hand, if the diodes are fabricated on a single chip 80, using conventional technology, as in FIG. 4, the larger divergence angle 90 will be perpendicular to the fast scan direction shown by the arrow Y. The FIG. 4 configuration will also work but will require a longer focal length, larger diameter collimator.

A logical extension to the architectures described above is to fabricate multiple lines of, for example, four diode arrays on a single chip in a two dimensional array. Such a staggered array can be fabricated monolithically by separately addressing lasers grown on a grooved substrate as described in U.S. Pat. No. 4,786,918, the disclosure of which is incorporated herein by reference. Arrays as large as 4×4 can be obtained by combining two of the staggered arrays. Alternately, 4×4 arrays can be obtained by replacing the separate single lasers with linear monolithic arrays of four diodes operating at the same wavelength. Independent addressing of each laser in each monolithic array is accomplished by patterning the metal on the mounting plate and spacer. Simultaneous writing of multiple lines achieved in these ways can be used to increase the speed of the system. That is, the output beams from each diode array would be directed to each of the stations instead of the output beam from a single diode for each station as described above.

In view of the foregoing, it will be understood that the present invention provides a ROS architecture that enables multiple laser diodes, having widely separated wavelengths, to be spaced a convenient distance apart because the diodes are arranged in a line extending in a direction parallel to the fast-scan direction of the ROS (i.e., perpendicular to the axis of rotation of the polygon mirror). This increased spacing simplifies the fabrication of the diodes, eliminates crosstalk, and eliminates the inconsistencies in beam characteristics between the light beams that exist when a line of diodes are spaced from each other in the cross-scan direction. The laser diodes can be fabricated on a single chip, or comprise individual diodes mounted on a mechanical structure, and positioned as close to each other as is convenient, using conventional laser diode fabricating techniques, on a line that is parallel to the fast scan direction of the ROS. Multiple lines of multi-diode arrays on a single chip or fabricated monolithically, can be used to achieve increased system speed. In addition, the present invention requires only a single optical system thus providing a very significant cost reduction over systems having plural optical systems.

What is claimed is:

1. A scanning optical system comprising:
    beam generating means for generating a plurality of light beams having dissimilar wavelengths and arranged in a line, said line being perpendicular to a direction in which said plurality of light beams are traveling;
    a polygon mirror, rotatably mounted on a central axis and located in a path of said plurality of light beams arranged in the line, simultaneously deflecting said plurality of light beams, said central axis extending perpendicular to said line of light beams, each of said plurality of light beams remaining separate during deflection from said polygon mirror;
    optical means for focusing said plurality of light beams on said polygon mirror;
    scan lens means for focusing said plurality of light beams deflected by said polygon mirror; and
    optical filtering means for differentially passing and reflecting said plurality of light beams deflected from said polygon mirror.

2. A scanning optical system, as recited in claim 1, wherein:
    each light beam has a large divergence angle parallel to the large divergence angle of the other light beams.

3. A scanning optical system, as recited in claim 2, wherein:
    said large divergence angle is perpendicular to the central axis of said polygon mirror.

4. A scanning optical system, as recited in claim 1, wherein:
    said beam generating means generates at least two light beams.

5. A scanning optical system, as recited in claim 1, wherein:
    said beam generating means generates at least three light beams.

6. A scanning optical system, as recited in claim 1, wherein:
    said plurality of light beams are simultaneously deflected by a single facet of said polygon mirror.

7. A raster output scanner comprising:
    beam generating means for generating four clustered laser beams having dissimilar wavelengths and arranged in a line, said line being perpendicular to a direction in which said four laser beams are travelling;
    a polygon mirror, rotatably mounted on a central axis and located in a path of said four laser beams arranged in the line, simultaneously deflecting the four clustered laser beams onto a first optical path, said central axis extending perpendicular to said line of said laser beams, each of said four clustered laser beams remaining separate during deflection from said polygon mirror;
    a first optical separator, disposed on said first optical path, directing a first laser beam and a second laser beam onto a disparate second optical path and directing a third laser beam and a fourth laser beam onto a disparate third optical path;
    a second optical separator, disposed on said second optical path, directing said first laser beam onto a disparate fourth optical path and directing said second laser beam onto a disparate fifth optical path; and
    a third optical separator, disposed on said third optical path, directing said third laser beam onto a disparate sixth optical path and directing said fourth laser beam onto a disparate seventh optical path.

8. A raster output scanner, as recited in claim 7, wherein:
    said beam generating means is a plurality of laser diodes wherein said laser diodes are disposed on a single chip.

9. A raster output scanner, as recited in claim 7, wherein:
said beam generating means is a plurality of laser diodes disposed on distinct chips connected to each other to form an integral structure.

10. A raster output scanner, as recited in claim 7, wherein:
said first, second, third and fourth laser beams create first, second, third and fourth spots on first, second, third and fourth image planes.

11. A raster output scanner, as recited in claim 7, wherein:
each laser beam has a large divergence angle parallel to the large divergence angle of the other laser beams.

12. A raster output scanner, as recited in claim 11, wherein:
said large divergence angle is perpendicular to the central axis of said polygon mirror.

13. A raster output scanner, as recited in claim 7, wherein:
said four clustered laser beams are simultaneously deflected by a single facet of said polygon mirror.

14. A raster output scanner comprising:
beam generating means for generating plural clustered light beams having dissimilar wavelengths and arranged in a line, said line being perpendicular to a direction in which said plural light beams are travelling;
a polygon mirror, rotatably mounted on a central axis and located in a path of said plural light beams arranged in the line, simultaneously deflecting said plural light beams onto an optical path, said central axis extending perpendicular to said line of said light beams, each of said plural light beams remaining separate during deflection from said polygon mirror; and
optical separator means for differentially passing and reflecting said light beams onto a different optical path for each light beam.

15. A raster output scanner, as recited in claim 14, wherein:
said optical separator means differentially passes and reflects said light beams based on wavelength.

16. A raster output scanner, as recited in claim 14, wherein:
each light beam has a large divergence angle parallel to the large divergence angle of the other light beams.

17. A raster output scanner, as recited in claim 16, wherein:
said large divergence angle is perpendicular to the central axis of said polygon mirror.

18. A raster output scanner, as recited in claim 14, wherein:
said plural light beams are simultaneously deflected by a single facet of said polygon mirror.

19. A multiple station printer, comprising:
beam generating means for generating four light beams having dissimilar wavelengths and arranged in a line, said line being perpendicular to a direction in which said four light beams are travelling;
a polygon mirror, rotatably mounted on a central axis and located in a path of said four light beams arranged in the line, simultaneously deflecting said four light beams onto a first optical path, said central axis extending perpendicular to said line of light beams, each of said four light beams remaining separate during deflection from said polygon mirror;
optical means for focusing said four light beams on said polygon mirror;
scan lens means for focusing said four light beams deflected by said polygon mirror;
a first optical separator, disposed on said first optical path, directing a first light beam and a second light beam onto a disparate second optical path and directing a third light beam and a fourth light beam onto a disparate third optical path;
a second optical separator, disposed on said second optical path, directing said first light beam onto a disparate fourth optical path and directing said second light beam onto a disparate fifth optical path;
a third optical separator, disposed on said third optical path, directing said third light beam onto a disparate sixth optical path and directing said fourth light beam onto a disparate seventh optical path; and
first, second, third and fourth photoreceptors respectively receiving said first, second, third and fourth light beams.

20. A printer, comprising:
beam generating means for generating a plurality of light beams having dissimilar wavelengths and arranged in a line, said line being perpendicular to a direction in which said plurality of light beams are travelling;
a polygon mirror, rotatably mounted on a central axis and located in a path of said plurality of light beams arranged in the line, simultaneously deflecting said plurality of light beams onto a first optical path, said central axis extending perpendicular to said line of light beams, each of said plurality of light beams remaining separate during deflection from said polygon mirror;
optical separator means for differentially passing and reflecting said plurality of light beams deflected from said polygon mirror onto disparate optical paths; and
a photoreceptor receiving each of said light beams at a disparate photoreceptive surface thereof.

21. The printer of claim 20, wherein said beam generating means is a plurality of laser diodes disposed on a single chip.

22. The printer of claim 20, wherein said beam generating means is a plurality of chips, each containing an individual laser diode, said chips being integrally attached to each other.

* * * * *